(12) United States Patent
Meldrum

(10) Patent No.: US 10,816,134 B2
(45) Date of Patent: Oct. 27, 2020

(54) VEHICLE DOOR HANGER

(71) Applicant: ARC OFF ROAD LLC, Carmel, IN (US)

(72) Inventor: Seth Meldrum, Carmel, IN (US)

(73) Assignee: ARC OFF ROAD LLC, Carmel, IN (US)

( * ) Notice: Subject to any disclaimer, the term of this patent is extended or adjusted under 35 U.S.C. 154(b) by 0 days.

(21) Appl. No.: 16/044,693

(22) Filed: Jul. 25, 2018

(65) Prior Publication Data

US 2019/0145576 A1    May 16, 2019

Related U.S. Application Data

(60) Provisional application No. 62/584,973, filed on Nov. 13, 2017.

(51) Int. Cl.
  *F16M 13/02*   (2006.01)
  *B25H 1/00*    (2006.01)
  *A47B 81/00*   (2006.01)

(52) U.S. Cl.
  CPC ............ *F16M 13/02* (2013.01); *B25H 1/00* (2013.01); *A47B 81/00* (2013.01)

(58) Field of Classification Search
  CPC .......... F16M 13/02; A47B 81/00; B25H 1/00; A47F 5/0006; A47G 1/20
  USPC ................. 248/301, 322, 339, 304; 211/20
  See application file for complete search history.

(56) References Cited

U.S. PATENT DOCUMENTS

| | | | | |
|---|---|---|---|---|
| 1,626,539 A | * | 4/1927 | Jones ................... | H04M 1/11 248/297.11 |
| 2,108,196 A | * | 2/1938 | Davies .................. | E04G 3/26 248/224.8 |
| 2,588,673 A | * | 3/1952 | Tyson ................... | E04D 1/34 52/546 |
| 2,648,103 A | * | 8/1953 | Wahlfeld ............ | E04F 13/0803 52/471 |
| 2,659,323 A | * | 11/1953 | Alvarez, Jr. ........ | E04D 13/1618 52/302.1 |

(Continued)

FOREIGN PATENT DOCUMENTS

CN    109373232 A  *  2/2019

OTHER PUBLICATIONS

TERAFLEX, Website: https://teraflex.com/shop_items/full-hard-door-hanger, 2018.

(Continued)

*Primary Examiner* — Kimberly T Wood
(74) *Attorney, Agent, or Firm* — Ward Law Office LLC; Jacob M. Ward

(57) ABSTRACT

A storage hanger includes a main body having a rear portion, a base portion, and a front portion. The rear portion has a proximal end and a distal end, At least one aperture is formed through the rear portion. The front portion has a proximal end and a free distal end. The base portion is coupled to the proximal end of the rear portion and the proximal end of the front portion. Each of the rear portion, the base portion, and the front portion share a common peripheral edge. The free distal end of the front portion further has at least one rounded section of the peripheral edge, which militates against damage to bulky items, such as a JEEP® door, placed on the storage hanger.

16 Claims, 6 Drawing Sheets

(56) References Cited

U.S. PATENT DOCUMENTS

| | | | | |
|---|---|---|---|---|
| D182,443 S | * | 4/1958 | Sherman | D19/90 |
| 3,738,076 A | * | 6/1973 | Kessler | E04F 13/0842 |
| | | | | 52/547 |
| 4,089,141 A | * | 5/1978 | Heroux | E04F 21/1855 |
| | | | | 52/105 |
| D300,972 S | * | 5/1989 | Streno | D34/6 |
| 5,135,192 A | * | 8/1992 | Winkler | E04H 12/2223 |
| | | | | 248/156 |
| D357,405 S | * | 4/1995 | Philippi | D6/567 |
| 5,509,632 A | * | 4/1996 | Mesna | A47F 5/083 |
| | | | | 248/301 |
| 5,794,395 A | * | 8/1998 | Reed | E04F 11/1812 |
| | | | | 403/230 |
| 6,302,365 B1 | * | 10/2001 | Catanzarite | A47G 25/0614 |
| | | | | 248/215 |
| 6,412,745 B1 | * | 7/2002 | Yokoyama | A47B 95/00 |
| | | | | 248/247 |
| 6,659,414 B1 | * | 12/2003 | Guilmette | A47H 1/18 |
| | | | | 248/303 |
| 6,811,038 B1 | † | 11/2004 | Sanderson | |
| D546,610 S | * | 7/2007 | Blanchard | D6/567 |
| D551,542 S | † | 9/2007 | Gallien | |
| D667,249 S | * | 9/2012 | London | D6/553 |
| 8,272,183 B2 | * | 9/2012 | Dodge | E04D 15/04 |
| | | | | 248/300 |
| D688,201 S | * | 8/2013 | Mecca | D13/108 |
| D688,202 S | * | 8/2013 | Mecca | D13/108 |
| D722,963 S | * | 2/2015 | Au-Yeung | D13/108 |
| 9,150,322 B2 | * | 10/2015 | Fitzpatrick | B65B 67/12 |
| D742,728 S | * | 11/2015 | Ostler | D8/373 |
| D769,024 S | * | 10/2016 | Montoya | D6/567 |
| 9,932,735 B1 | * | 4/2018 | Biasucci | E04B 1/2612 |
| 9,938,709 B2 | * | 4/2018 | Daudet | E04B 1/2403 |
| D819,427 S | * | 6/2018 | Mercaldi | D8/354 |
| 2002/0023366 A1 | * | 2/2002 | Bueno | E04D 1/34 |
| | | | | 33/647 |
| 2005/0218284 A1 | * | 10/2005 | kurrasch | A47G 1/20 |
| | | | | 248/303 |
| 2006/0103129 A1 | * | 5/2006 | Edwards | B62D 25/188 |
| | | | | 280/848 |
| 2008/0283705 A1 | * | 11/2008 | Morrison | A47G 1/06 |
| | | | | 248/304 |
| 2014/0033496 A1 | * | 2/2014 | Lettkeman | F16M 13/02 |
| | | | | 29/428 |
| 2015/0375936 A1 | * | 12/2015 | Fitzpatrick | B65B 67/12 |
| | | | | 248/101 |
| 2016/0362064 A1 | | 12/2016 | Singleton | |

OTHER PUBLICATIONS

TeraFlex 1830702 Freedom Top Full Door Holder, Publication Date: Jul. 20, 2015, Place of Publication: Amazon.com.†

Uploader: Aj Phillips, How to hang JK /JKU JL /JLU doors on a wall safley and for $40.00, Publication Date: May 25, 2017, place of publication: Youtube.com.†

(2) Jeep Wrangler Door Hangers Brackets for JK JKU TJ YJ LJ—Wall Mount Storage, Publication Date: Sep. 2, 2016, Place of Publication: Amazon.com.†

\* cited by examiner
† cited by third party

VEHICLE DOOR HANGER

CROSS-REFERENCE TO RELATED APPLICATIONS

This application claims the benefit of U.S. Provisional Application Ser. No. 62/584,973, filed on Nov. 13, 2017. The entire disclosure of the above application is hereby incorporated herein by reference.

FIELD

The present disclosure relates to a storage hanger and, more particularly, to a wall mounted storage hanger for vehicle doors.

BACKGROUND

Conventional storage fixtures, and particularly garage storage devices, have long been used to store items on the walls or ceiling of a garage. Many garages have been equipped with extensive shelving to store items off the garage floor. However, bulky items such as vehicle doors, bicycles, ladders and the like have presented additional problems.

Storing these bulky items on a wall can undesirably consume a major portion of available wall surface area. These bulky items have often been left on the garage floor for this reason. In certain cases, however, specialized fixtures are known for holding bulky items on the garage ceiling or wall. These specialized fixtures often position bulky items in hard to reach places, making it awkward to position or remove the stored items on the storage devices.

There is also a need for storing JEEP® doors, which are removable from the chassis of the JEEP® vehicle. Typical JEEP® doors weigh approximately 60 pounds, and it is undesirable to store them on the floor where they might be inadvertently damaged.

In one example, a wall mounted storage hanger for bulky items, such as vehicle doors, is described in U.S. Pat. No. 6,811,038 to Sanderson. The Sanderson patent teaches a surface-mounted bracket for receiving and storing removable vehicle doors, such as JEEP® doors. In another example, U.S. Pat. Appl. Pub. No. 2016/0362064 to Singleton teaches to portable carrying and storage systems for removable vehicle doors and hardtops, such as a JEEP® Wrangler hardtop and doors.

In a further example, the TERAFLEX® full hard door hanger, commercially available from TeraFlex, Inc. in West Jordan, Utah, is configured to support a vehicle door upon assembly. The TERAFLEX® hanger is long, unwieldy, and connects to a wall across multiple wall studs. The TERAFLEX® has been found to undesirably consume available wall surface area, thereby limiting the availability of the wall surface for storage of other items.

There is a continuing need for a wall mounted storage hanger that is compact, easy to install, and can accommodate bulky items. Desirably, the wall mounted storage hanger is usable with removable vehicle doors, such as JEEP® doors.

SUMMARY

In concordance with the instant disclosure, a wall mounted storage hanger that is compact, easy to install, and can accommodate bulky items, and which is usable with removable vehicle doors, such as JEEP® doors, has been surprisingly discovered.

In one embodiment, a storage hanger includes a main body with a rear portion, a base portion, and a front portion. The rear portion has a proximal end and a distal end, At least one aperture is formed through the rear portion. The front portion has a proximal end and a free distal end. The base portion is coupled to the proximal end of the rear portion and the proximal end of the front portion. Each of the rear portion, the base portion, and the front portion share a common peripheral edge. The free distal end of the front portion further has at least one rounded section of the peripheral edge. The rear portion is disposed on a first plane, the base portion is disposed on a second plane, and the front portion is disposed on a third plane. The first plane is oriented parallel with the third plane. The rear portion has a first length defined by a first distance between the proximal end and the distal end of the rear portion. The base portion has a second length defined by a second distance between the proximal end of the rear portion and the proximal end of the front portion. The front portion has a third length defined by a third distance between the proximal end and the distal end of the front portion. The first length is greater than the second length.

In another embodiment, the main body may have a thickness between 9-gauge and 14-gauge and is covered with an anticorrosive coating. The free distal end further has beveled corners. The bevel corners are disposed on fourth planes that are oriented transverse to the third plane. The free distal end of the front portion further has at least one of a first rounded section and a second rounded section that is disposed adjacent one of the beveled corners. Each of the first rounded section and the second rounded section may have a radius between 0.080 inches and 0.240 inches. In this embodiment, a center of the second aperture is also disposed on a fifth plane, and the free distal end of the front portion is disposed on a sixth plane. The fifth plane is spaced apart from the sixth plane by a length between 0.1 inches and 0.5 inches.

In a further embodiment, a method of hanging a vehicle door includes the steps of providing the storage hanger, and also providing a vehicle door having a window opening with a peripheral elastomeric seal. The vehicle door also has an upper slot disposed adjacent the elastomeric seal, which is normally configured to receive an upper edge of a window pane when in a closed position. A first fastener is then inserted into the first aperture, and a second fastener is inserted into the second aperture of the main body of the storage hanger. The first fastener and the second fastener are then secured to a single stud in the wall. The vehicle door is then disposed on the storage hanger with the window pane in an opened position. The upper slot of the door receives the front portion of the storage hanger. The vehicle door is thereby supported by the storage hanger on the wall.

DRAWINGS

The above, as well as other advantages of the present disclosure, will become readily apparent to those skilled in the art from the following detailed description, particularly when considered in the light of the drawings described herein.

DETAILED DESCRIPTION

Figures 1, 2:
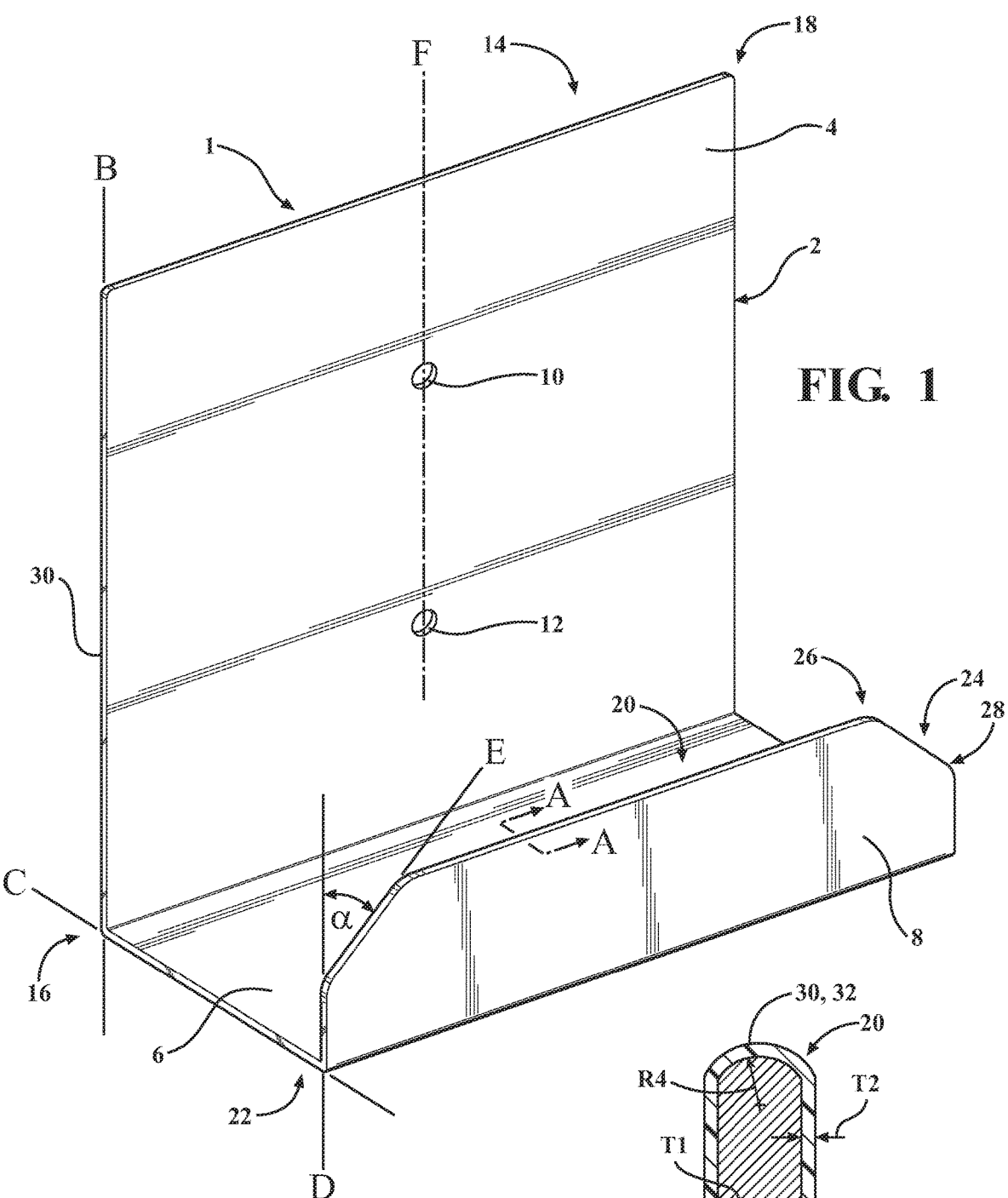
FIG. 1 is a top perspective view of a storage hanger according to one embodiment of the present disclosure.
FIG. 2 is a fragmentary, cross-sectional, front elevational view of a front portion of the storage hanger taken at section line A-A in FIG. 1.

The following detailed description and appended drawings describe and illustrate various embodiments of the invention. The description and drawings serve to enable one skilled in the art to make and use the invention, and are not intended to limit the scope of the invention in any manner.

FIGS. 1-11 illustrate a storage hanger 1. The storage hanger 1 is configured to support bulky items, such as a vehicle door 102, and most particularly a JEEP® vehicle door 102 (shown in FIG. 11) having a weight of at least 60 pounds. The storage hanger 1 has a main body 2 with a rear portion 4, a base portion 6, and a front portion 8.

As shown in FIGS. 1, 3, and 6-8, the rear portion 4 has at least one aperture 10, 12. The at least one aperture 10, 12 may include a first aperture 10 and a second aperture 12, for example. Each of the apertures 10, 12 is configured and sized to receive a fastener, as described further hereinbelow.

Figure 11:
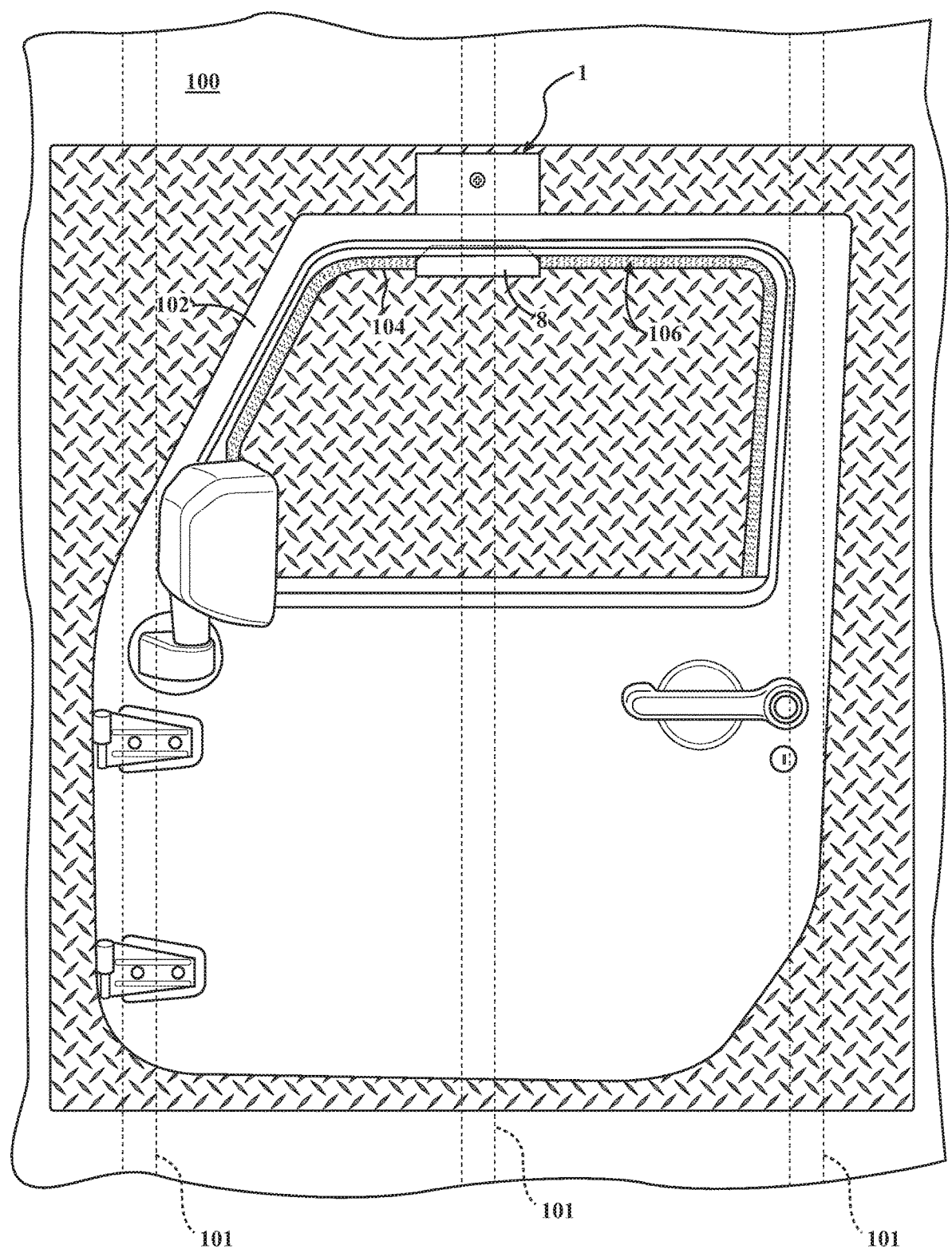
FIG. 11 is a front elevational view of the storage hanger shown in FIG. 1, further illustrated in operation attached to a single stud of a wall and supporting a vehicle door.

In particular, the first aperture 10 and the second aperture 12 may be spaced apart in series. This allows the main body 2 to be mounted on a single stud 101 of a wall 100 or another mountable surface, as shown in FIG. 11. It should be appreciated that the ability to mount the main body 2 on a single stud 101 is especially advantageous, and may provide for more usable space on the wall 100.

Although the storage hanger 1 is shown in FIGS. 1, 3, and 6-8 as having only two of the apertures 10, 12 arranged in the series, it should be understood that any other suitable number of the apertures 10, 12 may also be employed, as desired. The main body 2 may also have other apertures or holes in various shapes and arrangements, for example, to facilitate branding. The shapes and arrangements of these additional holes may also provide a desirable or unique ornamentation, for example, the shape associated with the grille of a JEEP® vehicle. However, it should also be understood that only the apertures 10, 12 in the main body 2, which are disposed vertically in series, are configured to receive fasteners and used to attach the storage hanger 1 to the surface of the wall 100, within the scope of the disclosure.

As shown in FIG. 11, the material of the main body 2 is thin enough to be placed in the window opening of a JEEP® vehicle door 102, while also being strong enough to support the weight of the door 102 on the wall 100 to which the storage hanger 1 is attached. The main body 2 may be made of metal, plastic, wood, or any other suitable material chosen by a skilled artisan. In a particular example, the main body 2 may be manufactured from 11-gauge hot rolled steel that has a thickness T1 between about 0.120 and about 0.1250 inches, as shown in FIG. 2. Other suitable thicknesses for T1 are also contemplated, such as 9-gauge, 10-guage, 12-guage, and 14-gauge as non-limiting examples, and may also be employed, as long as the material selection on the thinner gauges is selected so as to have sufficient strength to support the weight of the door 102 without undesirable bending or dropping of the door 102 to the floor surface. The thickness T1 must also be thin enough to freely disposed in the conventional upper slot 106 of the window opening of the door 102, which receives the front portion 8 main body 2 in operation, as described further hereinbelow.

It should be understood that the main body 2 may also be manufactured according to any suitable manufacturing process. For example, the rear portion 4, the base portion 6, and the front portion 8 may be integrally formed as a single, unitary, one-piece assembly. As a particular example, the main body 2 and the at least one aperture 10, 12 are cut from a steel sheet using a laser. The main body 2 is then placed in a brake press and bent to form the rear portion 4, base portion 6, and front portion 8. The storage hanger 1 according to one embodiment of the disclosure is thereby manufactured.

Figure 6:
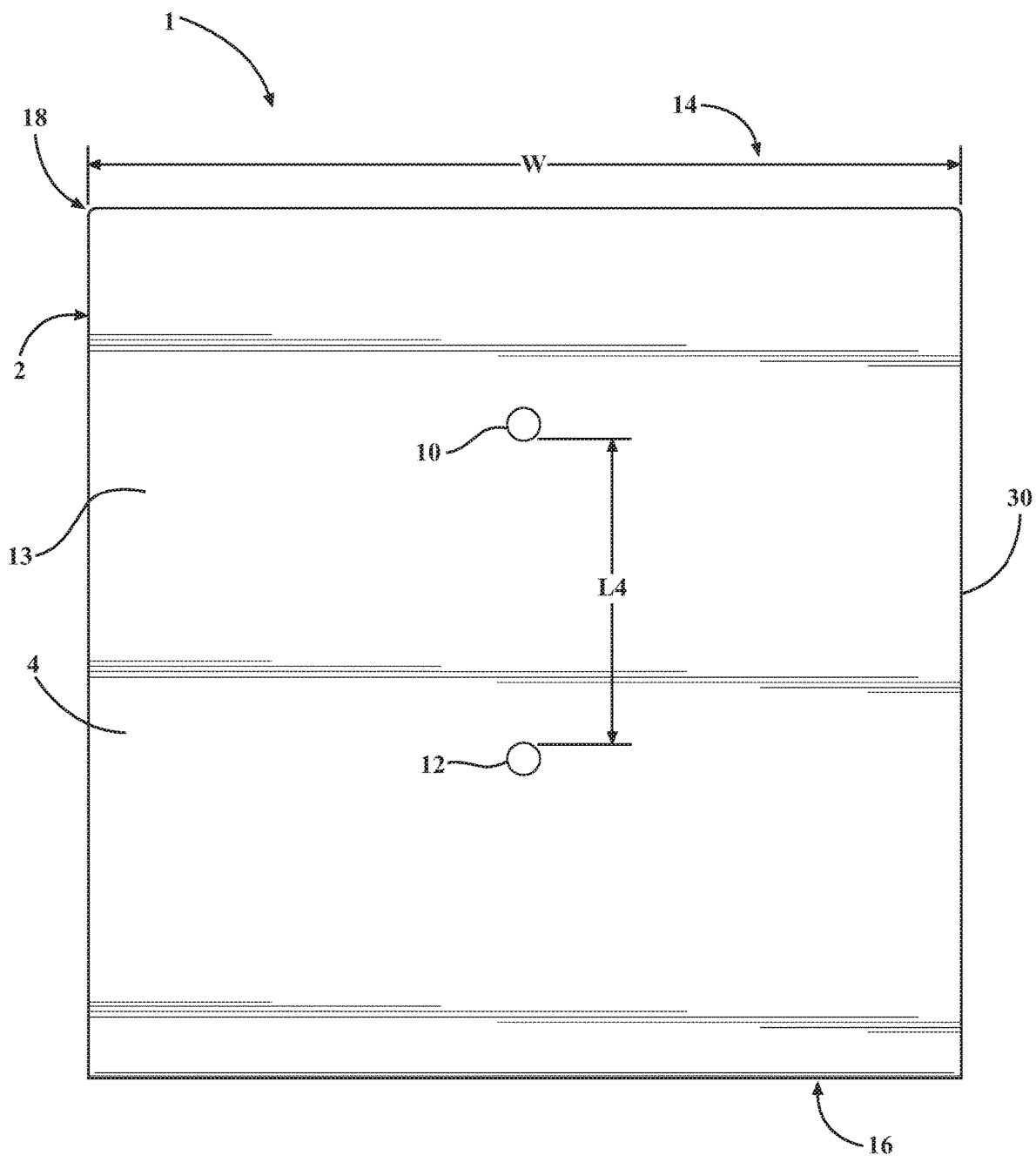
FIG. 6 is a rear elevational view of the storage hanger shown in FIG. 1.
Figure 7:
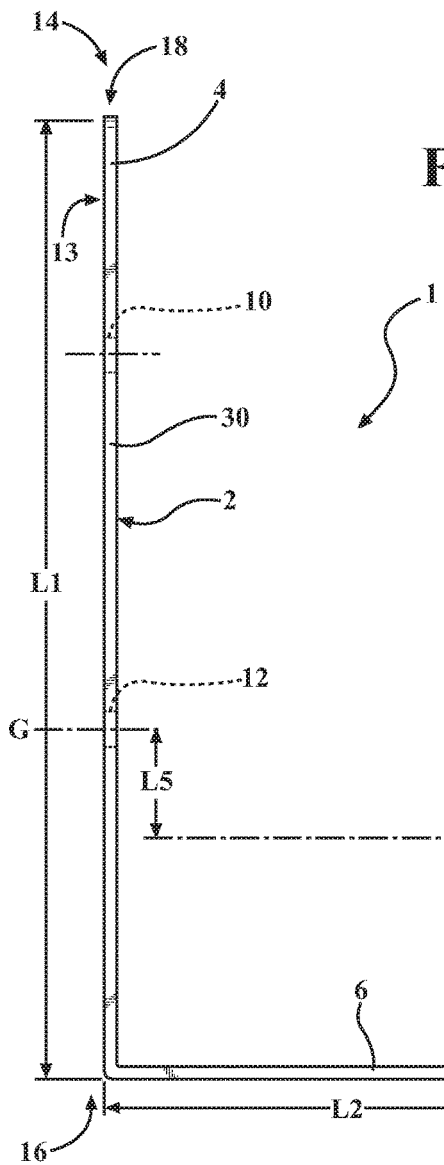
FIG. 7 is a left side elevational view of the storage hanger shown in FIG. 1.
Figure 8:
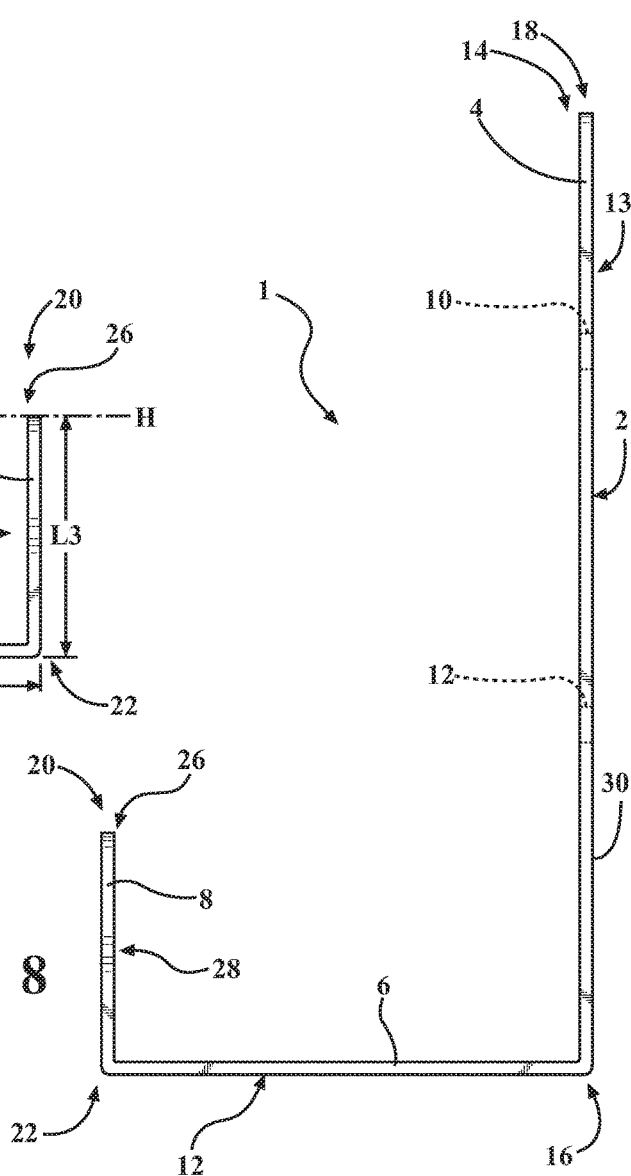
FIG. 8 is a right side elevational view of the storage hanger shown in FIG. 1.
Figure 9:
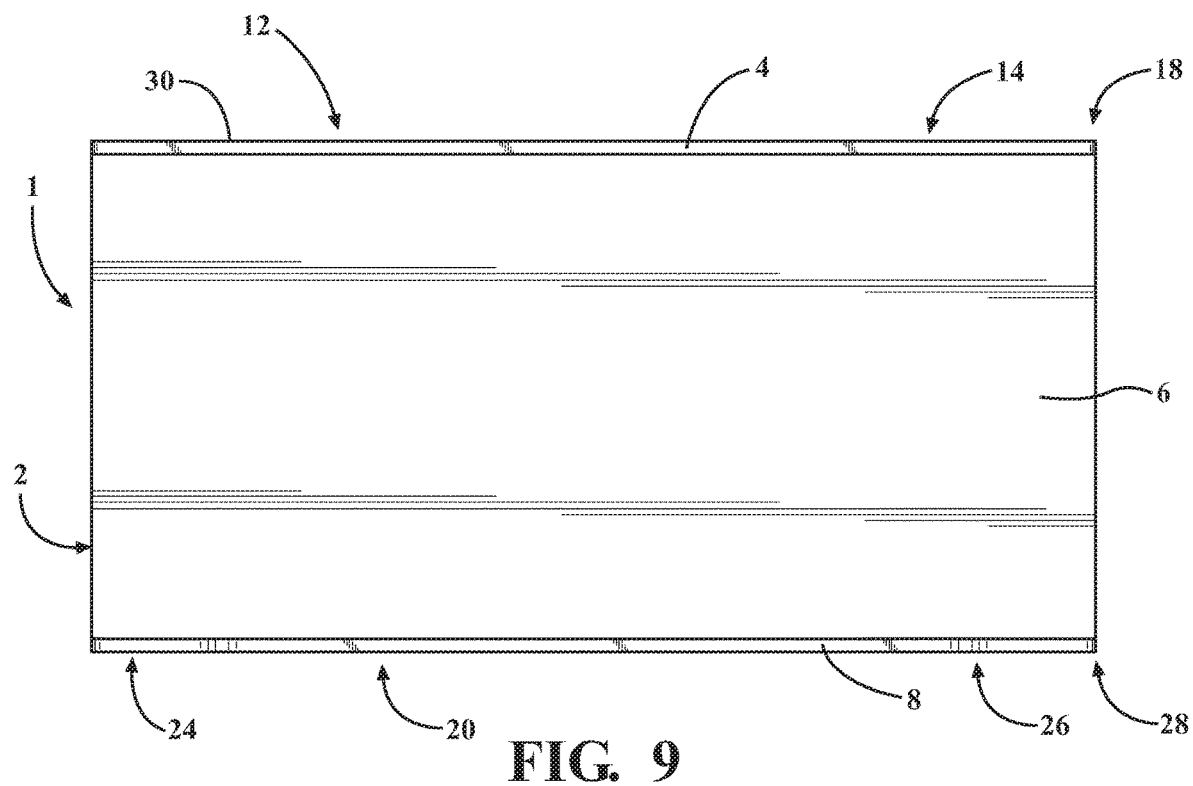
FIG. 9 is a top plan view of the storage hanger shown in FIG. 1.
Figure 10:
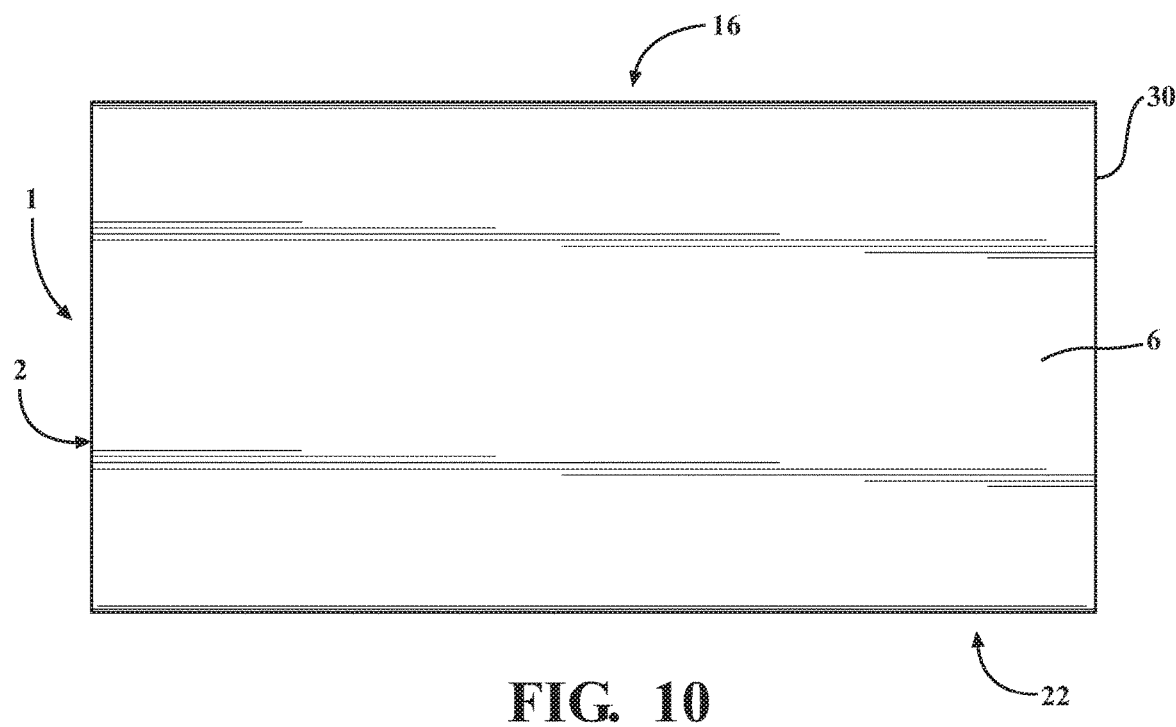
FIG. 10 is a bottom plan view of the storage hanger shown in FIG. 1.

With reference to FIGS. 6-8, the rear portion 4 of the main body 2 may have a rear surface 13 that is substantially planar. The planar configuration of the rear surface 13 advantageously permits an abutting of the entirety of the rear surface 13 with a mounting surface of the wall 100 in operation, as shown in FIG. 11. This has been found to facilitate a stability of the hanger 1 during use.

With renewed reference to FIGS. 1 and 7-8, the base portion 6 may extend outwardly from the rear portion 4. The base portion 6 connects the rear portion 4 with the front portion 8. The rear portion 4 is thereby spaced apart from the front portion 8. The front portion 8 protrudes from the base portion 6. In operation, and as described further hereinbelow, the front portion 8 is configured to securely hold the bulky items on the main body 2.

As depicted in FIG. 1, the rear portion 4 of the main body 2 is disposed on a first plane B. The base portion 6 of the main body 2 is oriented on a second plane C. The front portion 8 of the main body 2 is positioned on a third plane D. The center of the first aperture 10 and the second aperture 12 are each aligned along an axis E, and are co-planar with the first plane B.

In a particular embodiment, the first plane B is oriented transverse to the second plane C, and in a most particular embodiment the first plane B is oriented orthogonal to the second plane C. In another embodiment, the first plane B is oriented transverse to the second plane C and parallel to the third plane D. In a most particular embodiment, the first plane B is oriented orthogonal to the second plane C and parallel to the third plane D. In a further embodiment, the axis E bisects the rear portion 4 of the main body 2. One of ordinary skill in the art may also select other suitable orientations for the rear portion 4, the base portion 6, the front portion 8, and the first and second apertures 10, 12, as desired.

With renewed reference to FIGS. 1, 3, and 6-8, the rear portion 4 of the main body 2 has a distal end 14 and a proximal end 16. The proximal end 16 abuts the base portion 6. In particular, the proximal end 16 of the rear portion 4 may be connected to or contiguous with the base portion 6.

Figure 4:
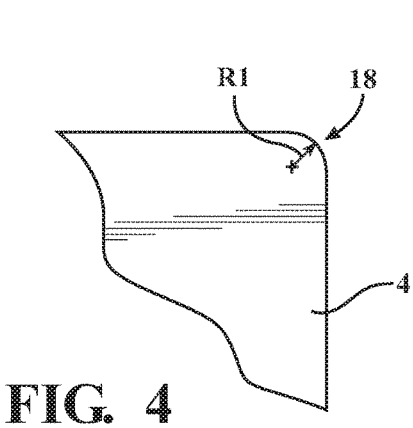
FIG. 4 is a fragmentary, front elevational view of the front portion of the storage hanger taken at call-out 4 in FIG. 3.

As shown in FIG. 4, the distal end 14 of the rear portion 4 may have rounded corners 18. The corners 18 are rounded to militate against a damaging of the mounting surface of the wall 100 by the rear portion 4 upon installation and use, as depicted in FIG. 11. With renewed reference to FIG. 4, each of the corners 18 may have a first radius of curvature or radius R1. As non-limiting examples, the first radius R1 may be between 0.050 and 0.200 inches, more particularly between 0.093 and 0.168 inches, and most particularly 0.135 inches. One of ordinary skill in the art may also select other suitable dimensions for the first radius R1 within the scope of the disclosure.

With renewed reference to FIGS. 1, 3, and 7-8, the front portion 8 also has a distal end 20 and a proximal end 22. The proximal end 22 of the front portion 8 abuts the base portion 6. In particular, the proximal end 22 of the front portion 8 may be connected to or contiguous with the base portion 6.

Figure 3:
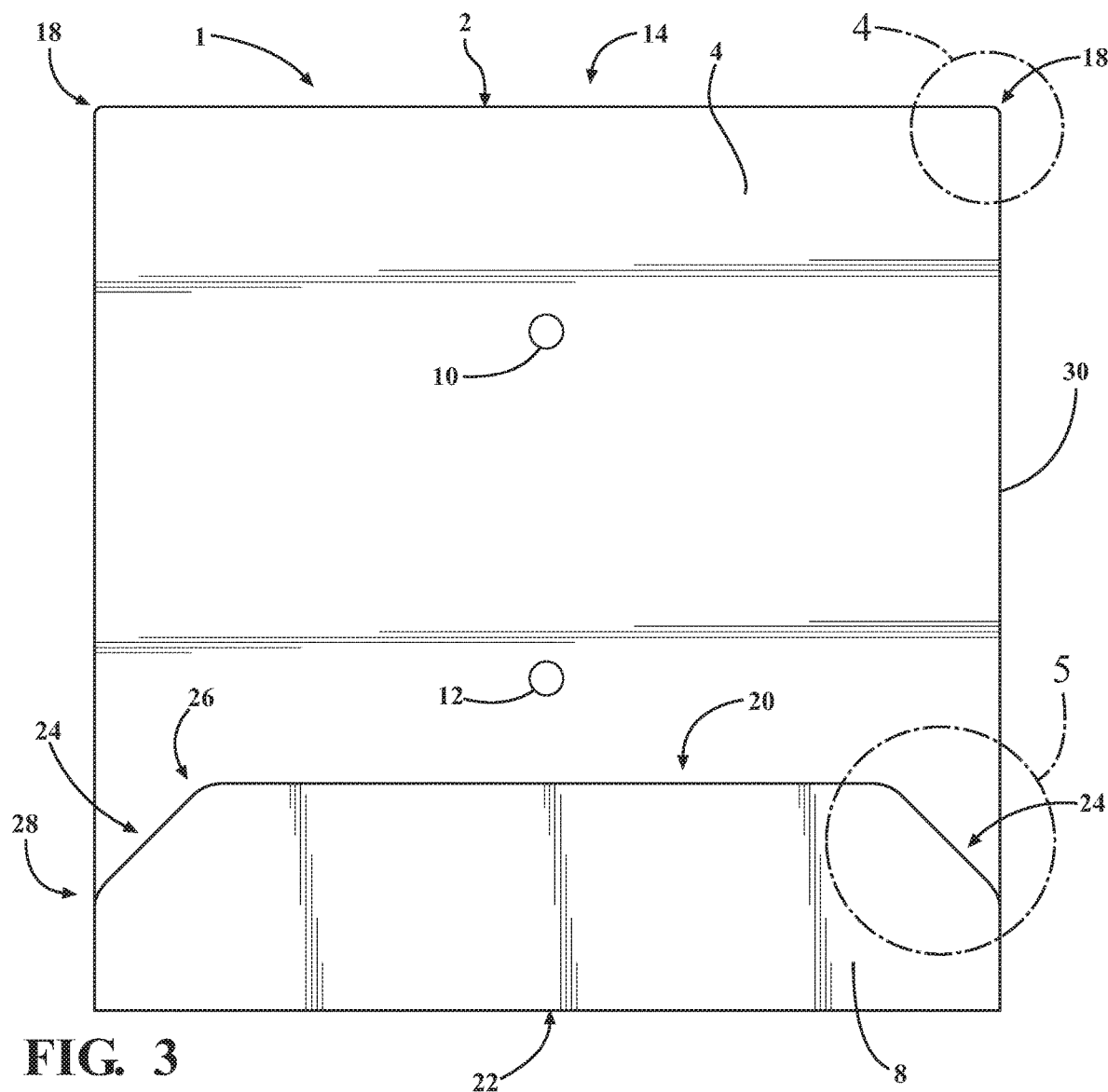
FIG. 3 is a front elevational view of the storage hanger shown in FIG. 1.
Figure 5:
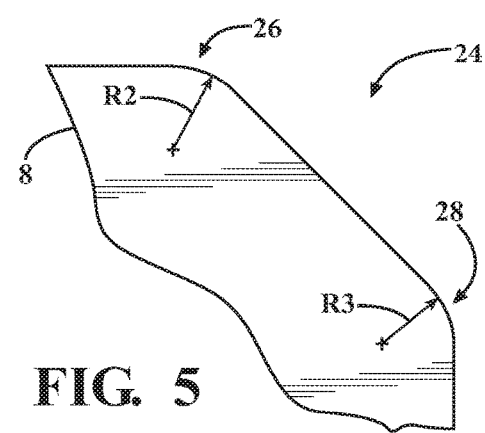
FIG. 5 is a fragmentary, front elevational view of a corner of a rear portion of the storage hanger taken at call-out 5 in FIG. 3.

As illustrated in FIGS. 3 and 5, the distal end 20 of the front portion 8 may have beveled corners 24. Each of the beveled corners 24 may have at least one of a first rounded section 26 and a second rounded section 28. In certain examples, the front portion 8 may have only a single first rounded section 26, connecting a top section of the front portion 8 with the beveled corner 24, and with a remaining portion of the beveled corner 24 extending directly upward at an angle less than 90 degrees relative to the plane C from the base portion 6. In a most particular example, as shown in FIG. 5, the front portion 8 has both the first rounded section 26 and the second rounded section 28, with the first rounded section 26 connecting the top section of the front portion 8 to the beveled corner 24, and the second rounded section 28 connected the beveled corner 24 to a vertical section that extends upwardly from the base portion at an angle of about 90 degrees relative to the plane C from the base portion 6. For example, the first rounded section 26 may have a second radius R2 and the second rounded section 28 may have a third radius R3. As non-limiting examples, the second radius R2 and the third radius R3 is each between 0.080 and 0.240 inches, more particularly between 0.120 and 0.200, and most particularly 0.160 inches. The second radius R2 and the third radius R3 may be the same or different, as desired.

It should also be appreciated that the beveled corners 24 may have only the first rounded section 26 with the second radius R2. In this example, a bottom of each of the beveled corners 24 may be directly attached to, or contiguous with, the base portion 6 of the hanger 1 without any intervening second rounded section 28.

With renewed reference to FIG. 11, advantageously, the rounded corners 26, 28 are configured to minimize damage to the items placed on the storage hanger 1 in operation. More specifically, the rounded corners 26, 28 may militate against harm caused to the elastomeric seals 104 associated with window openings of vehicle doors 102. The rounded corners 26, 28 may be provided by a grinding process during the manufacture of the main body 2, or by any other suitable means selected by a skilled artisan.

As illustrated in FIG. 1, each of the beveled corners 24 may be disposed on a fourth plane E. The fourth plane E is oriented traverse to the third plane D. The fourth plane E may be oriented at an angle α, which is hereby defined as the angle between planes D and E. As non-limiting examples, the angle α may be between 10° and 80°, more particularly between 35° and 55°, and most particularly 45°. One of ordinary skill in the art may select other suitable angles α, as desired.

As shown in FIGS. 1-2, the entirety of the main body 20 has a peripheral edge 30. The peripheral edge 30 extends around an entirety of the main body 2 and defines free edges of each of the rear portion 4, the base portion 6, and the front portion 8. At least a portion of the peripheral edge 30 may be contoured to minimize an opportunity for damage to both the mounting surface of a wall 100 and the bulky item placed on the storage hanger 1, as shown in FIG. 11.

With continued reference to FIGS. 1-2 the contoured peripheral edge 30 may involve one of an angled and a curvilinear surface. For example, rounded sections of the peripheral edge 30 may define the rounded corners 18 of the rear portion 4 as described hereinabove. It should be appreciated that the entirety of the peripheral edge 30 may have the same contour, or different portions of the peripheral edge 30 may be provided with different contours, within the scope of the disclosure.

For example, as shown in FIG. 2, the distal end 20 of the front portion 8 may have a contoured edge 32. In particular, the contoured edge 32 of the distal end 20 may be rounded with a fourth radius R4. As non-limiting examples, the fourth radius R4 is between 0.020 and 0.100 inches, more particularly between 0.040 and 0.080 inches, and most particularly 0.060 inches. It should be appreciated that the rounding of the contoured edge 32 may further militate against damage to bulky items placed on the hanger 1, and particularly the seal 104 of a door 102 window. In alternative embodiments, the contoured edge may be provided as an angled surface, which likewise may be adapted to minimize and opportunity for damage to the bulky item. A skilled artisan may also select other suitable dimensions within the scope of the present disclosure.

In certain embodiments, shown in FIG. 6, the rear portion 4, the base portion 6, and the front portion 8 may all have a maximum width W that is substantially the same or different. Where the maximum width W is the same for the rear portion 4, the base portion 6, and the front portion 8, it should be appreciated that a force on the storage hanger 1 in operation may be distributed more evenly. In turn, this optimizes a durability of the storage hanger 1 and minimizing an opportunity for damage to the mounting surface of the wall 100.

Also, as shown in FIGS. 7 and 8, the rear portion 4 may have a first length L1, the base portion 6 may have a second length L2, and the front portion may have a third length L3. Particularly, the first length L1 may span a first distance between the distal end 14 and the proximal end 16 of the rear portion 4. The second length L2 may be defined by a second distance between the proximal end 16 of the base portion 4 and the proximal end 22 of the front portion 8. The third length L3 may be defined by a third distance between the proximal end 22 and the distal end 20 of the front portion 6. The first length L1 of the rear portion 4 may be greater than the second length L2 of the base portion 6. The third length L3 of the front portion 8 may be shorter than the second length L2 of the base portion 6. The third length L3 of the front portion 8 may also be shorter than the first length L1 of the rear portion 4.

It should be understood that the first length L1, being greater than each of the lengths L2 and L3, may permit for a stabilization and superior weight distribution on a single stud of the wall 100 to which the storage hanger is mounted in operation, as shown in FIG. 11.

With renewed reference to FIGS. 6 and 7, in a most particular embodiment, the maximum width W of the main body 2 may be about 6 inches, the first length L1 of the rear portion 4 may be about 6 inches, the second length L2 of the base portion may be about 3.5 inches, and the third length L3 of the front portion 8 may be about 1.8, or 1.5 inches in the third length L3. It has been found that these particular dimensions advantageously permit for the hanging of the bulky item, and particularly the JEEP® door 102, on a single wall stud without damage to either the wall mounting surface 100 or the door 102 or its associated window seal 104, as shown in FIG. 11. However, the main body 2, the rear portion 4, the base portion 6, and the front portion 8 may also be any other suitable dimension configured for use with a single wall stud as chosen by one skilled in the art.

With renewed reference to FIG. 6, the apertures 10, 12 on the rear portion 4 may also be selectively spaced apart at a fourth length L4. In operation, this militates against an undesirable rotation of the storage hanger 1 relative to the mounting surface of the wall 100. As a particular example, the fourth length L4 may be at least about 2.25 inches. It has further been found that, having the fourth length L4 between the apertures 10, 12 be at least about 2.25 inches better distributes the force on the single wall stud caused by the hanging JEEP® door 102. In a further particular example, L4 is about 2.5 inches. The fourth length L4 thereby militates against an undesired cracking of the wall stud and inadvertent pulling out of the fasteners by an otherwise close placement of the fasteners relative to each other.

With renewed reference to FIGS. 7 and 8, the second aperture 12 may be vertically spaced apart from the distal end 20 of the front portion 8 to facilitate the fastening of the rear portion 4 to the mounting surface. For example, a center of the second aperture 12 may be disposed on a fifth plane G and the distal end 20 of the front portion 8 may be disposed on a sixth plane H. A distance between the fifth plane G and the sixth plane H may be defined as a fifth length L5, as shown in FIG. 7. In a particular embodiment, the fifth length L5 may be between about 0.1 and about 0.5 inches, more particularly between about 0.2 and about 0.4 inches, and most particularly about 0.3 inches. It should be appreciated that the fifth plane G is not disposed below the sixth plane H, and that the aforementioned spacing of the fifth length L5 advantageously permits for the use of implements such as screwdrivers and power tools to insert the fasteners within the apertures 10, 12 without inference from the front portion 8. One of ordinary skill in the art may also select other suitable distances for the fifth length L5, as desired.

The main body 2 may be provided with anticorrosive coating 34. For example, the anticorrosive coating 34 may be a powder coating such as an epoxy, polyester, fluoropolymers, or urethane, as particular non-limiting examples. In a specific embodiment, the anticorrosive coating 34 may be applied electrostatically and then cured under heat. In particular, and as shown in FIG. 2, the anticorrosive coating 34 may have a thickness T2 of between about 0.0005 and about 0.0120 inches, more particularly between about 0.0010 and about 0.0070 inches, and most particularly about 0.0020 inches. In a most particular example, a total thickness T3 of the main body 2, which is the sum of the thickness T1 and twice the thickness T2, is approximately 0.1265 inches. Other suitable types and thicknesses of the anticorrosive coating 34 for the main body 2 may also be used within the scope of the disclosure.

In operation, as shown in FIG. 11, a user secures the storage hanger 1 to the single stud in the wall 100 by inserting fasteners, such as screws, bolts, or nails, through the apertures 10, 12. For example, the apertures 10, 12 may have a diameter sized to accommodate various common fasteners sizes. In a most particular example, the apertures 10, 12 are substantially circular and the diameter of each of the first aperture 10 and the second aperture 12 is about 0.250 inches. Other suitable sizes and shapes for the apertures 10, 12 may also be employed by the skilled artisan.

Once the storage hanger 1 is attached to the wall 100, a user then places the bulky item such as the JEEP® vehicle door 102 onto the main body 2 with the window pane in an opened position. In a particular embodiment, the JEEP® vehicle door 102 is placed so the front portion 8 of the hanger 1 is disposed in and received by an upper slot 106 of the door 102, which is disposed adjacent the peripheral elastomeric seal 104 and that is normally configured to receive an upper edge of the window pane where in a closed position. It should be appreciated that the combination of the contoured edge 32 and the rounded beveled corners 24 of the front portion 8 minimizes an opportunity for damage to the window seals 104 when the door 102 is placed on the front portion 6.

Advantageously, the storage hanger 1 of the present disclosure is compact, has been found easy to install, and can accommodate bulky items such as removable JEEP® doors 102. Being compact, and configured to attached to just the single wall stud 101 instead of across multiple wall studs 101, the storage hanger 1 of the present disclosure does not consume an undesirable amount of wall surface area, in contrast to known hangers in the art.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method of hanging a vehicle door to a wall, comprising:

providing the vehicle door having a window opening with a peripheral elastomeric seal, and an upper slot disposed adjacent the elastomeric seal and configured to receive an upper edge of a window pane of the vehicle door when in a closed position;

providing a storage hanger including a main body having thickness between 9-gauge and 14-gauge for an entirety of the main body, the main body having a rear portion, a base portion, and a front portion, the main body covered with an anticorrosive coating, the rear portion having a proximal end and a distal end, a first aperture and a second aperture formed through the rear portion, the first aperture and the second aperture each disposed on an axis that bisects the rear portion, the front portion having a proximal end and a free distal end, the base portion coupled to the proximal end of the rear portion and the proximal end of the front portion, each of the rear portion, the base portion, and the front portion sharing a common peripheral edge, wherein the main body is configured to support a weight of at least 60 pounds, wherein the rear portion is disposed on a first plane, the base portion is disposed on a second plane, and the front portion is disposed on a third plane, and the first plane is oriented parallel with the third plane and orthogonal with the second plane, and wherein the rear portion has a maximum width and a first length, the first length defined by a distance between the proximal end and the distal end of the rear portion, the base portion has a second length defined by a distance between the proximal end of the rear portion and the proximal end of the front portion, and the front portion has a third length defined by a distance between the proximal end and the distal end of the front portion, and the first length is greater than the second length and the third length, wherein the free distal end of the front portion has a contoured uppermost edge, the contoured uppermost edge being part of the common peripheral edge, and the contoured uppermost edge being one of rounded and angled and configured to militate against damage to the elastomeric seal of the vehicle door, wherein the free distal end further has beveled corners, and wherein the free distal end of the front portion further has at least one rounded section disposed between the contoured uppermost edge and each of the beveled corners, wherein each of the rounded sections of the free distal end of the front portion of the storage hanger has a radius between 0.080 inches and 0.240 inches;

inserting a first fastener into the first aperture and inserting a second fastener into the second aperture;

securing the first fastener and the second fastener to only a single stud in the wall, wherein the maximum width of the main body does not span an entire distance between adjacent studs in the wall, and the free distal end of the front portion is upwardly facing; and placing the vehicle door on the front portion of the main body with the window pane in an opened position, the upper slot of the vehicle door receiving the front portion of the storage hanger where the peripheral elastomeric seal is disposed entirely above the second plane, whereby the vehicle door is supported by the storage hanger.

2. The method of claim 1, wherein the beveled corners of the storage hanger are on a fourth plane, the fourth plane oriented transverse to the third plane and defining an angle therebetween, the angle being between 10 degrees and 80 degrees.

3. The method of claim 2, wherein the angle is about 45 degrees.

4. The method of claim 1, wherein the distal end of the rear portion of the storage hanger has corners, and there are no holes formed in the rear portion adjacent to the corners, and the storage hanger is secured to the wall with only the first fastener and the second fastener.

5. The method of claim 4, wherein the corners are rounded corners, and a first radius of each of the rounded corners is be between 0.050 and 0.200 inches.

6. The method of claim 1, wherein the first length of the rear portion is about 6 inches, the second length of the base portion is about 3.5 inches, and the third length of the front portion is about 1.8 inches.

7. The method of claim 1, wherein a center of the second aperture is disposed on a fifth plane and the free distal end of the front portion is disposed on a sixth plane, a distance between the fifth plane and the sixth plane being between 0.1 inches and 0.5 inches.

8. The method of claim 1, wherein the anticorrosive coating is a powder coating including one of an epoxy, polyester, fluoropolymers, and urethane, and the anticorrosive coating has a thickness between 0.0005 and 0.0120 inches.

9. A hanging vehicle door system, comprising:

a vehicle door having a window opening with a peripheral elastomeric seal, and an upper slot disposed adjacent the elastomeric seal and configured to receive an upper edge of a window pane of the vehicle door when in a closed position;

a storage hanger configured to hold at least 60 pounds including a main body having thickness between 9-gauge and 14-gauge for an entirety of the main body, the main body having a rear portion, a base portion, and a front portion, the main body covered with an anticorrosive coating, the rear portion having a proximal end and a distal end, a first aperture and a second aperture formed through the rear portion, the first aperture and the second aperture each disposed on an axis that bisects the rear portion, the front portion having a proximal end and a free distal end, the base portion coupled to the proximal end of the rear portion and the proximal end of the front portion, each of the rear portion, the base portion, and the front portion sharing a common peripheral edge, wherein the rear portion is disposed on a first plane, the base portion is disposed on a second plane, and the front portion is disposed on a third plane, and the first plane is oriented parallel with the third plane and orthogonal with the second plane, and wherein the rear portion has a maximum width and a first length, the first length defined by a distance between the proximal end and the distal end of the rear portion, the base portion has a second length defined by a distance between the proximal end of the rear portion and the proximal end of the front portion, and the front portion has a third length defined by a distance between the proximal end and the distal end of the front portion, and the first length is greater than the second length and the third length, wherein the free distal end of the front portion has a contoured uppermost edge, the contoured uppermost edge being part of the common peripheral edge, and the contoured uppermost edge being one of rounded and angled and configured to militate against damage to the elastomeric seal of the vehicle door, wherein the free distal end further has beveled corners, and wherein the free distal end of the front portion further has at least one rounded section disposed between the contoured uppermost edge and each of the beveled corners, wherein each of the rounded sections of the free distal end of the front portion of the storage hanger has a radius between 0.080 inches and 0.240 inches;

a first fastener inserted into the first aperture and a second fastener inserted into the second aperture, the first fastener and the second fastener secured to only a single stud in a wall, wherein the maximum width of the main body does not span an entire distance between adjacent studs in the wall, and the free distal end of the front portion is upwardly facing; and wherein the vehicle door is placed on the front portion of the main body with the window pane in an opened position, the upper slot of the vehicle door receiving the front portion of the storage hanger where the peripheral elastomeric seal is disposed entirely above the second plane, whereby the vehicle door is supported by the storage hanger.

10. The system of claim 9, wherein the beveled corners of the storage hanger are on a fourth plane, the fourth plane oriented transverse to the third plane and defining an angle therebetween, the angle being between 10 degrees and 80 degrees.

11. The system of claim 10, wherein the angle is about 45 degrees.

12. The system of claim 9, wherein the distal end of the rear portion of the storage hanger has corners, and there are no holes formed in the rear portion adjacent to the corners, and the storage hanger is secured to the wall with only the first fastener and the second fastener.

13. The system of claim 12, wherein the corners are rounded corners, and a first radius of each of the rounded corners is be between 0.050 and 0.200 inches.

14. The system of claim 9, wherein the first length of the rear portion is about 6 inches, the second length of the base portion is about 3.5 inches, and the third length of the front portion is about 1.8 inches.

15. The system of claim 9, wherein a center of the second aperture is disposed on a fifth plane and the free distal end of the front portion is disposed on a sixth plane, a distance between the fifth plane and the sixth plane being between 0.1 inches and 0.5 inches.

16. The system of claim 9, wherein the anticorrosive coating is a powder coating including one of an epoxy, polyester, fluoropolymers, and urethane, and the anticorrosive coating has a thickness between 0.0005 and 0.0120 inches.

* * * * *